United States Patent
Fukano et al.

(10) Patent No.: US 6,210,860 B1
(45) Date of Patent: Apr. 3, 2001

(54) RECORDING MEDIUM

(75) Inventors: Tatsuo Fukano; Naohiko Kato; Yasuhiko Takeda; Akihiro Takeichi; Tomoyoshi Motohiro, all of Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/285,757

(22) Filed: Apr. 5, 1999

(30) Foreign Application Priority Data

Apr. 9, 1998 (JP) .................................................. 10-097776
Sep. 18, 1998 (JP) .................................................. 10-265020

(51) Int. Cl.$^7$ ...................................................... G11B 7/24
(52) U.S. Cl. ................................ 430/270.12; 430/270.11; 430/945; 428/64.2; 428/64.4
(58) Field of Search ......................... 430/270.11, 270.12, 430/945; 428/64.2, 64.4

(56) References Cited

U.S. PATENT DOCUMENTS

| | | | | |
|---|---|---|---|---|
| 3,959,799 | * | 5/1976 | Gambino et al. | 430/524 |
| 4,477,819 | * | 10/1984 | Lee et al. | 347/264 |
| 4,772,897 | * | 9/1988 | Ohkawa | 346/135.1 |
| 5,652,037 | * | 7/1997 | Ohkawa et al. | 428/64.1 |

FOREIGN PATENT DOCUMENTS 62-226442 10/1987 (JP) .
2-152029 6/1990 (JP) .

* cited by examiner

Primary Examiner—John A. McPherson
(74) Attorney, Agent, or Firm—Oblon, Spivak, McClelland, Maier & Neustadt, P.C.

(57) ABSTRACT

A recording medium which includes a first substance and a second substance, wherein an external energy is applied to at least one of the first and second substances to react them in order to change the optical characteristics of the substances for recording information, the recording medium including: a first layer composed of a first substance including at least one of S and Se, a second layer composed of a second substance including a metal, and a barrier layer being disposed between the first and second layers, which allows the reaction between the first and second layers when laser beam for recording is irradiated as an external energy, and suppresses the reaction between the first and second layers when laser beam for recording is not irradiated. Alternatively, the recording medium can be free from the barrier layer, and the second substance can be arranged to have two or more compositionally different portions or two or more phases with a different crystalline state. Thus, when the external energy is not applied, the reaction between the first substance and the second substance is suppressed. Hence, the recording characteristics of the recording medium is inhibited from degrading.

20 Claims, 6 Drawing Sheets

Fig. 2

| Sample No. | GeS$_x$ Film Thickness | ZnS Film Thickness | In Film Thickness | Reflectance | Recording Power | C/N | Modulation |
|---|---|---|---|---|---|---|---|
| 1 | 185 nm | 1 nm | 65 nm | 42% | 6 mW | 48 dB | 78% |
| 2 | 184 nm | 2 nm | 65 nm | 65% | 6 mW | 50 dB | 78% |
| 3 | 182 nm | 3 nm | 65 nm | 65% | 7 mW | 50 dB | 83% |
| 4 | 181 nm | 4 nm | 65 nm | 66% | 7 mW | 49 dB | 85% |
| 5 | 180 nm | 5 nm | 65 nm | 66% | 8 mW | 49 dB | 83% |
| 6 | 186 nm | none | 65 nm | 35% | 7 mW | 48 dB | 77% |

Fig. 3

| Sample No. | GeS$_x$ Film Thickness | C Film Thickness | In Film Thickness | Reflectance | Recording Power | C/N | Modulation |
|---|---|---|---|---|---|---|---|
| 7 | 185 nm | 1 nm | 65 nm | 52% | 6 mW | 48 dB | 78% |
| 8 | 184 nm | 2 nm | 65 nm | 65% | 7 mW | 49 dB | 78% |
| 9 | 182 nm | 3 nm | 65 nm | 65% | 8 mW | 48 dB | 85% |

Fig. 5

| | Reflectance at Unrecorded Portions | Recording Laser Laser Power | C/N | Modulation | Noise Level |
|---|---|---|---|---|---|
| 3rd Pref. Embodiment | 65% | 7 mW | 52 dB | 85% | -58 dBm |
| 4th Pref. Embodiment | 63% | 7 mW | 51 dB | 85% | -55 dBm |
| Comparative Example | 30% | 6 mW | 47 dB | 85% | -51 dBm |

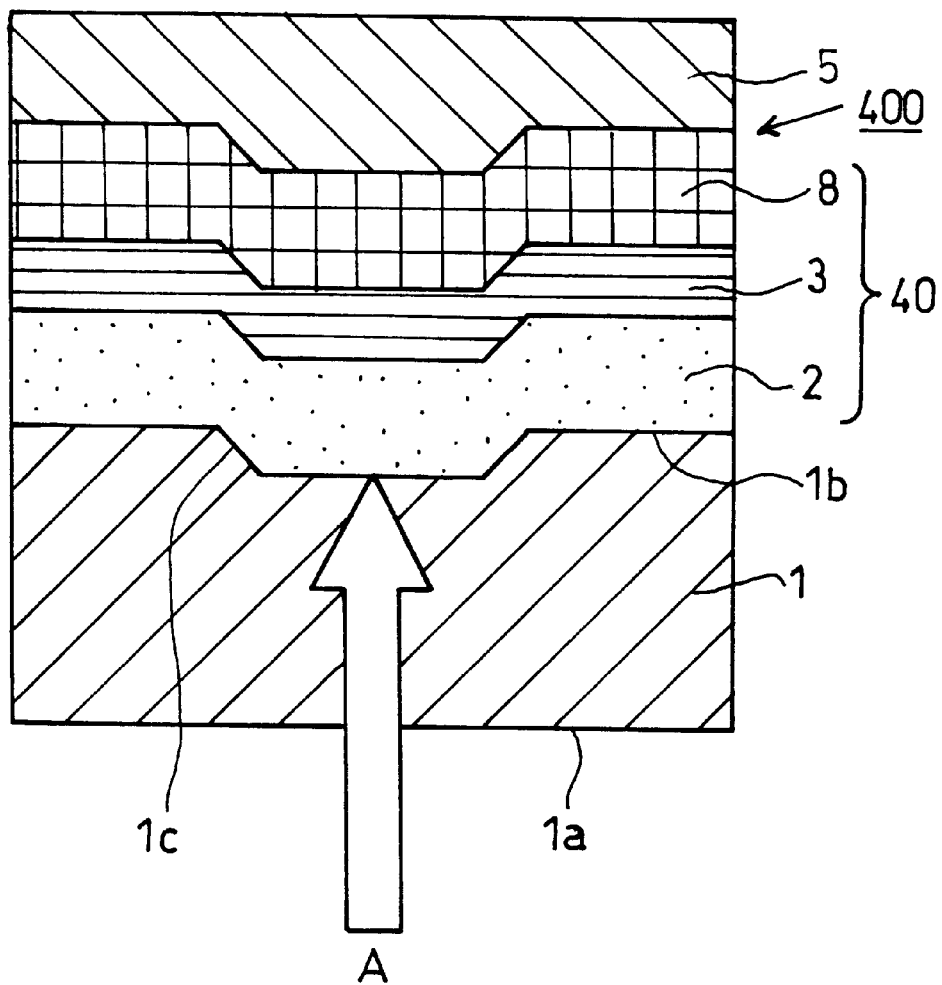

RECORDING MEDIUM

BACKGROUND OF THE INVENTION

1. Field of the invention

The present invention relates to a recording medium which comprises a first substance and a second substance at least, and whose optical characteristics are varied to record information by applying an external energy for reaction to at least one of the first and second substances.

2. Description of the Related Art

As a conventional optical recording medium, for example, Japanese Unexamined Patent Publication (KOKAI) No. 62-226,442 discloses an optical recording medium in which a mixture film (a single-layered film) is used as a recording film. The mixture film is composed of a low-melting point metal (e.g., In or Zn) and sulfide (e.g., $GeS_x$). Japanese Unexamined Patent Publication (KOKAI) No. 2-152,029 discloses another optical recording medium in which a layered film is used as a recording film. The layered film is composed of a metallic layer (i.e., a first layer), which includes Al, Cu or Ag, and the other layer (i.e., a second layer), which includes S, Se or mixtures thereof.

These recording films are formed by a vapor deposition method or a sputtering method. Since the recording films exhibit reactivity, the recording films are modified chemically and/or physically by irradiating with a recording laser beam (or by applying an external energy). Accordingly, the optical characteristics of the recording films, such as the reflectance, are varied, thereby recording information.

Japanese Unexamined Patent Publication (KOKAI) No. 62-226,442 discloses to form the mixture film of the low-melting point metal (e.g., In, etc.) and the sulfide (e.g., GeS) by a co-vapor deposition method, or the like, in the preferred embodiments. However, according to the investigations carried out by the inventors of the present invention, the reaction proceeds considerably between the metal and the sulfide during the formation of the mixture film. As a result, there is a possibility that the entire reflectance of the optical recording medium decreases significantly, and this causes problems in applying the optical recording medium to practical uses.

Japanese Unexamined Patent Publication (KOKAI) No. 2-152,029 discloses the laminated construction in which the metal of high reactivity (e.g., Ag, etc.) are laminated on S. However, according to the investigations carried out by the inventors of the present invention, it can be readily judged that such a system suffers from severe chronological degradations, for instance, the layers react with each other even when information is not being recorded. Hence, it is believed that, the optical recording medium suffers from problems in practical uses. Moreover, in the preferred embodiments, the values of C/N (Carrier to Noise ratio, i.e., output level ratio of carrier to noise) are listed, but do not imply the favorable characteristics.

Thus, in the conventional optical recording media, unnecessary reactions, such as the reactions in the formation of the films and the chronological degradations, are allowed, because they use reactive recording films. Hence, the conventional optical recording media have problems in that the recording characteristics, such as the reflectance, degrade in the formation of the films and during the ordinary service.

SUMMARY OF THE INVENTION

The present invention has been developed in view of the aforementioned problems. It is therefore an object of the present invention to suppress the reactions degrading the recording characteristics of a recording medium which comprises a first substance and a second substance at least, and whose optical characteristics are varied to record information by applying an external energy to at least one of the first and second substances to react the first and second substances.

The inventors of the present invention investigated into recording films in which information was recorded by irradiating with a recording laser beam. The inventors considered that it is easier to control the reactions in laminated constructions than in single-layered films. In the laminated constructions, the laminated layers react with each other by irradiating with a laser beam, and vary the optical characteristics to record information. Based on the idea, the inventors diligently studied the laminated constructions. Then, the inventors thought of providing a threshold level at which the reaction occurs between the mutual layers, and which differs between the case where the recording laser beam is irradiated and the case where the recording laser beam is not irradiated (including during a film making process). Thus, the inventors completed a first aspect of the present invention.

The first aspect of the present invention is a recording medium which comprises a first substance and a second substance, wherein an external energy is applied to at least one of the first and second substances to react them in order to change the optical characteristics of the substances for recording information, the recording medium comprising:

a first layer composed of a first substance including at least one of S and Se, a second layer composed of a second substance including a metal, and a barrier layer being disposed between the first and second layers, which allows the reaction between the first and second layers when laser beam for recording is irradiated as an external energy, and suppresses the reaction between the first and second layers when laser beam for recording is not irradiated.

In the first aspect of the present invention, when the laser beam for recording is irradiated, namely when information is recorded, the first layer and/or the second layer go over (pass through) the barrier layer and/or destroy (break through) the barrier layer at portions which are irradiated with the laser beam. The first layer and the second layer undergo a chemical reaction, thereby forming reaction products (e.g., sulfide, selenide or mixtures thereof). Accordingly, at these portions, the optical characteristics (e.g., reflectance, etc.) are varied so that information can be recorded. On the other hand, when the laser beam for recording is not irradiated (i.e., when the films are formed or when the present recording medium is put in the ordinary service), the interposing barrier layer suppresses the reaction between the first layer and the second layer. Consequently, the reaction of a recording film itself is suppressed. Hence, it is possible to inhibit the recording characteristics of the present recording medium from degrading.

According to the investigations carried out by the inventors of the present invention, the following were found to be appropriate for the first layer, the second layer and the barrier layer.

The first layer can preferably be composed of Ge and S. Specifically, the first layer can preferably be composed of at least one member selected from the group consisting of $GeS_x$ ($0<x\leq2$), a Ge—Zn—S compound and a Ge—S—O compound. In the $GeS_x$, the value "x" can further preferably fall in the range of more than 1 to 2 or less (i.e., $1<x\leq2$) because the $GeS_x$ exhibits enhanced transparency in the visible-ray region and because a recording laser power can be decreased.

The second layer can preferably be composed of at least one member selected from the group consisting of Sn, In, Sb, Bi, Pb, Cr, Mn, Fe, Ni, Cu, Zn and Ag. Specifically, the second layer can preferably be composed of at least one member selected from the group consisting of the simple substance of In, the simple substance of Cr, an In—Sn alloy and an Au—Cu alloy.

The barrier layer can preferably be composed of at least one member selected from the group consisting of a metal, sulfide, nitride, boride, carbon (C), carbide, oxide and phosphide. Specifically, the barrier layer can preferably be composed of at least one member selected from the group consisting the simple substance of C, ZnS, the simple substance of Si and $SiO_2$. Moreover, depending on the material qualities, etc., the thickness of the barrier layer can preferably be 2 nm or more, further preferably fall in the range of from 2 to 5 nm.

The inventors of the present invention further investigated into the first substance and the second substance, and devised an advantageous combination of the first and second substances. Thus, the inventors completed a second aspect of the present invention.

The second aspect of the present invention is a recording medium comprising a first substance and a second substance at least, and whose optical characteristics are varied to record information by applying an external energy for recording to at least one of the first and second substances to react the first and second substances, wherein:

the first substance including at least one of S and Se; and
the second substance having two or more compositionally different portions or two or more phases with a different crystalline state.

In the second aspect of the present invention, the second substance is a substance in which two or more compositionally different portions or two or more phases of different crystalline states exist. Accordingly, it is possible to coexist a compositional portion, which is likely to react with the first substance, with the other compositional portion, which is less likely to react with the first substance, in the second substance. Alternatively, it is possible to change the degree of solid diffusion by varying crystalline states in the second substance. Consequently, it is possible to coexist a highly reactive phase with a lowly reactive phase in the second substance.

Therefore, in the second aspect of the present invention, it is believed that the lowly reactive phase plays a role of a reaction barrier in the formation of the films or during the service of the present recording medium. This is accomplished by appropriately determining the compositional or crystalline states in the second substance. Thus, it is possible to suppress the unnecessary reactions which degrade the recording characteristics of the present recording medium.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 2 is a table for summarizing the relationships between the thicknesses of the barrier layers and the recording characteristics of the First Preferred Embodiment of the present invention;

FIG. 3 is a table for summarizing the relationships between the thicknesses of the barrier layers and the recording characteristics of the Second Preferred Embodiment of the present invention;

FIG. 5 is a table for summarizing the recording characteristics of the Third Preferred Embodiment and the Fourth Preferred Embodiment of the present invention and those of a comparative example; and FIG. 6 is an explanatory diagram for illustrating the partial cross-sectional construction of an optical disk according to the Fourth Preferred Embodiment of the present invention.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

First Preferred Embodiment

Figure 1:
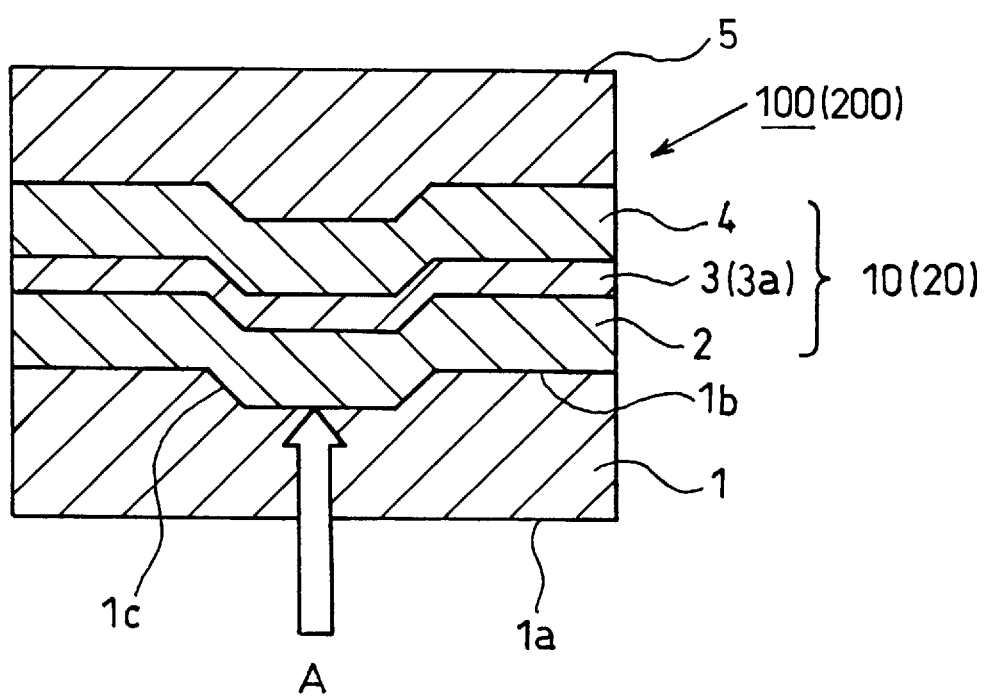
FIG. 1 is an explanatory diagram for illustrating the partial cross-sectional construction of an optical disk according to the First and Second Preferred Embodiments of the present invention.

A recording medium of this First Preferred Embodiment is directed to recording information by varying a recording film physically and/or chemically by irradiating with a recording laser beam. For example, it is applicable to an optical disk in which music or data is recorded as information. FIG. 1 illustrates the partial cross-sectional construction of an optical disk (optical recording medium) 100 of this preferred embodiment.

An optical disk 100 is in a disk shape as a whole. As illustrated in FIG. 1, a plurality of layers are formed and laminated. 1 is a disk-shaped transparent substrate (for example, in a thickness of 1.2 mm) made from polycarbonate, for instance. A laser beam for optically recording and reading out information enters from a one side 1a of the substrate 1 in the direction specified by the arrow "A". The side 1a, the laser-beam-incidence side, is a flat surface. In the opposite side 1b, there is formed a spiral or concentric guide groove (track) 1c for leading the laser beam.

On the opposite side 1b of the substrate 1, there is formed a $GeS_x$ ($0<x\leq2$) film 2 as a first layer. On the $GeS_x$ film 2, there is formed a ZnS film 3 as a barrier layer. On the ZnS film 3, there is formed an In film 4 as a second layer. Here, the ZnS film 3 has a thickness (for example, 2 nm or more) which is appropriate for suppressing the physical and/or chemical reaction between the $GeS_x$ film 2 and the In film 4. Here, the films 2, 3 and 4 constitute a recording film 10 in the optical disk 100. Moreover, on the In film 4, there is formed an ultraviolet-curable resin film (protective film) 5 which covers the recording film 10 to protect it.

Next, a manufacturing method of the optical disk 100 will be described in detail with reference to a specific example.

The substrate 1 was prepared. The side 1a was formed as a flat surface. In the opposite side 1b, there was formed the guide groove 1c. The substrate 1 was composed of a disk having a thickness of 1.2 mm, and was made from polycarbonate. On the opposite side $1b$ of the substrate 1, the GeS$_x$ film 2 in a thickness of 182 nm was formed by an RF magnetron sputtering method with a GeS$_2$ target under the following film forming conditions of sputtering gas species: Ar, sputtering gas pressure: $3\times10^{-3}$ Torr and input electric power: 50–200 W.

Subsequently, without canceling the vacuum, the ZnS film 3 in a thickness of 3 nm was formed by an RF magnetron sputtering method with a ZnS target under the following film forming conditions of sputtering gas species: Ar, sputtering gas pressure: $3\times10^{-3}$ Torr and input electric power: 50–200 W.

Still subsequently, without canceling the vacuum, the In film 4 in a thickness of 65 nm was formed by an RF magnetron sputtering method with an In target under the following film forming conditions of sputtering gas species: Ar, sputtering gas pressure: $3\times10^{-3}$ Torr and input electric power: 50–200 W.

Finally, the ultraviolet-curable resin was coated by a spin coating method. The ultraviolet-curable resin was cured by using a high-pressure mercury-vapor lamp to form the resin film 5. Thus, the optical disk 100 was manufactured.

The recording actions of the optical disk 100 of this preferred embodiment are as hereinafter described. In the portion of the guide groove $1c$, the recording laser beam enters (irradiates) in the direction of the arrow "A", and is optically focused on the surface of the In film 4. The In film 4 goes over (breaks through) the ZnS film 3, and the GeS$_x$ film 2 and the In film 4 undergo a chemical reaction. Accordingly, the optical characteristics (reflectance, etc.) vary at the reacted portions so that information can be recorded. It is believed that, in the reaction between the GeS$_x$ film 2 and the In film 4, sulfides (InS$_3$), etc., are formed.

When the recording laser beam is not irradiated (for instance, when the films are formed or when the optical disk 100 is put in the ordinary service), the reaction between the GeS$_x$ film 2 and the In film 4 is suppressed because the GeS$_x$ film 2 and the In film 4 are separated by the ZnS film 3. Consequently, the reaction of the recording film 10 itself is suppressed. As a result, the recording characteristics can be inhibited from degrading. The operations and advantages of this preferred embodiment will be hereinafter described more specifically with reference to the results of verifications to which the optical disk 100 (Sample No. 3 in FIG. 2 described later) manufactured by the aforementioned manufacturing method was subjected.

In the optical disk 100 which was manufactured by the aforementioned manufacturing method, information was recorded by irradiating with a laser beam (recording laser beam) of wavelength: 780 nm from the flat surface side (side $1a$) through an objective lens of NA (numerical aperture): 0.5 and by optically focusing the laser beam on the surface of the In film 4. At this moment, the irradiating conditions were linear velocity: 2.8 m/sec, recording frequency: 400 kHz and recording laser wave form: rectangular wave of 50% duty ratio.

The characteristics (recording characteristics) of the optical disk 100 in this instance were reflectance at unrecorded portions: 65%, recording laser power: 7 mW, C/N: 50 dB and modulation: 83%. Note that the modulation is a value which is obtained by subtracting the reflectance after the recording from the reflectance before the recording, multiplying the difference by a factor of 100 and dividing the product by the reflectance before the recording.

Moreover, FIG. 2 summarizes the results of the optical disk characteristics as set forth above were measured by variously changing the thickness of the ZnS film 3 as the barrier layer (Sample Nos. 1, 2, 4 and 5), and also summarizes the aforementioned results (Sample No. 3). Note that the summed thickness of the GeS$_x$ film 2 and the ZnS film 3 was fixed at $\lambda/2$, an optical-path thickness, with respect to the wavelength $\lambda$ of the laser beam. Also Note that, in FIG. 2, Sample No. 6 was a comparative example to the present invention, and was free from the barrier layer.

As set forth in FIG. 2, it is understood that the optical disks 100 of this preferred embodiment listed as Sample Nos. 1 through 5 exhibited remarkably higher reflectance than the optical disk of the comparative example (Sample No. 6), and that they were well balanced in terms of the characteristics, such as the reflectance, the recording power, the C/N and the modulation. This results from the arrangement that the reaction between the GeS$_x$ film 2 and the In film 4 is suppressed even in the formation of the films. Note that, by comparing the reflectance of Sample No. 1 and those of Sample Nos. 2 through 5, the ZnS film 3 as the barrier layer, can preferably have a thickness of 2 nm or more in view of the characteristics of the optical disks.

Moreover, the respective optical disks of Sample Nos. 1 through 6 were subjected to an environmental resistance test which was carried out at 55° C. for 96 hours. The optical disks (Sample Nos. 1 through 5) of this preferred embodiment hardly showed the degradation in the characteristics within the measurement errors. Whereas, it was impossible for the optical disk of the comparative example to read out the recorded data. In the optical disk of the comparative example, the reflectance was degraded sharply (it was varied from 35% to 28%). The advantage results from the arrangement that the reaction between the GeS$_x$ film 2 and the In film 4 is suppressed by the presence of the ZnS film 3.

As described so far, the optical disks 100 of this preferred embodiment are characterized in that they are balanced in terms of the characteristics, such as the reflectance, the recording power, the C/N and the modulation, better than the conventional optical disk which are free from the barrier layer.

Moreover, in this preferred embodiment, the ZnS film 3 is interposed between the GeS$_x$ film 2 and the In film 4. Accordingly, the reaction is suppressed in the formation of the films, under ordinary environment, and under the high-temperature-and-high humidity conditions such as the aforementioned environmental resistance test. Thus, the reflectance (initial reflectance) at the unrecorded portions of the optical disk can be heightened remarkably, and the recording characteristics (reflectance, recording powder, C/N and modulation) can be inhibited from degrading. In addition, the data retention characteristic can be improved sharply.

Second Preferred Embodiment

In the optical disk 100 illustrated in FIG. 1, this Second Preferred Embodiment differs from the recording medium of the aforementioned First Preferred Embodiment in that the barrier layer is a carbon (C) film $3a$ instead of the ZnS film. The recording medium of this preferred embodiment operates and effects advantages in the substantially same manner as the aforementioned First Preferred Embodiment. Hereinafter, the portions, which differ from those of the First Preferred Embodiment, will be described mainly. A manufacturing method of this preferred embodiment will be described in detail with reference to a specific example.

First, on the opposite side $1b$ of the substrate 1, the GeS$_x$ film 2 in a thickness of 182 nm was formed by an RF magnetron sputtering method as aforementioned.

Subsequently, without canceling the vacuum, the C film 3a in a thickness of 3 nm was formed by an RF magnetron sputtering method with a C target under the following film forming conditions of sputtering gas species: Ar, sputtering gas pressure: $3 \times 10^{-3}$ Torr and input electric power: 200–400 W. Still subsequently, the In film 4 was formed in a thickness of 65 nm, and the resin film 5 was formed as aforementioned. Thus, the optical disk 200 was manufactured. The films 2, 3a and 4 constitute a recording film 20 in the optical disk 200.

In this optical disk 200, information was recorded by irradiating with a laser beam (wavelength: 780 nm) from the side of the flat surface (side 1a) and by optically focusing the laser beam on the surface of the In film 4 under the same laser-beam irradiating conditions as aforementioned. The characteristics of the optical disk 200 in this instance were reflectance at unrecorded portions: 65%, recording laser power: 8 mW, C/N: 48 dB and modulation: 85%.

Moreover, FIG. 3 summarizes the results of the optical disk characteristics as set forth above were measured by variously changing the thickness of the C film 3a (Sample Nos. 7 and 8), and also summarizes the aforementioned results (Sample No. 9). Note that the summed thickness of the $GeS_x$ film 2 and the C film 3a was fixed similarly at $\lambda/2$, an optical-path thickness, with respect to the wavelength $\lambda$ of the laser beam. As set forth in FIG. 3, it is understood that the optical disks 200 of this preferred embodiment listed as Sample Nos. 7 through 9 exhibited remarkably higher reflectance than the optical disk of the aforementioned comparative example (Sample No. 6), and that they were well balanced in terms of the characteristics, such as the reflectance, the recording power, the C/N and the modulation. It is appreciated that the C film 3a can preferably have a thickness of 2 nm or more in view of the characteristics of the optical disks.

Thus, in this preferred embodiment as well, the presence of the C film 3a suppresses the reaction between the $GeS_x$ film 2 and the In film 4 in the formation of the films. Accordingly, it is possible to suppress the reactions in the recording film 20, reactions which degrade the recording characteristics.

Modified Versions of First and Second Preferred Embodiments

In addition, the first layer can be composed of a Ge—Zn—S compound or a Ge—S—O compound. The second layer can be composed of Cu or Fe. The barrier layer can be composed of Si or $SiO_2$. In the specific arrangements of the optical disk 100 or 200, these constituent compounds or elements are selected and combined. Such specific arrangements operate and effect advantages in the same manner as the First and Second Preferred Embodiments.

Moreover, the barrier layers 3 and 3a can include a substance whose melting point or decomposition temperature (herein after referred to as the "melting point") is 300° C. or less, as a constituent element. Hence, in recording information, the barrier layers 3 and 3a decompose, sublimate or melt at the portions composed of the above substance when the recording film is heated by the laser beam to a temperature of more than the melting point. Thus, the first layer and the second layer can react with each other, and thereby information can be recorded. Whilst, before recording information, the barrier layer 3 and 3a shut off the first layer 2 from the second layer 4, and thereby the reaction between the first and second layers 2 and 4 are inhibited. As a result, it is possible to further upgrade the stability of the recording film 10 or 20 against heat.

The melting point of the substance can preferably be 300° C. or less, further preferably fall in the range of from 100 to 300° C., because the power of the recording laser beam, which is applied to record information, should be enlarged when it exceeds 300° C. Thus, such a higher melting point is not practical. For example, the substance exhibiting the melting point of 300° C. or less can be organic substances, such as alkyl compounds, and can preferably be transparent or metallic gloss with respect to the wavelength of the recording laser beam.

In the optical disk 100 shown in FIG. 1, the layers 2 through 4 of the recording film 10 can be laminated in the reverse order. For instance, the layers can be formed in the following order: on the other opposite surface 1b of the substrate 1, there can be formed the second layer, such as the In film. On the second layer, there can be formed the barrier layer, such as the ZnS film or the C film. On the barrier layer, there can be formed the first layer, such as the $GeS_x$ film. In this instance, the required thickness of the barrier layer can be thinner than those of the First and Second Preferred Embodiments. If such is the case, it is possible to obtain similar advantages.

Third Preferred Embodiment

Figure 4:
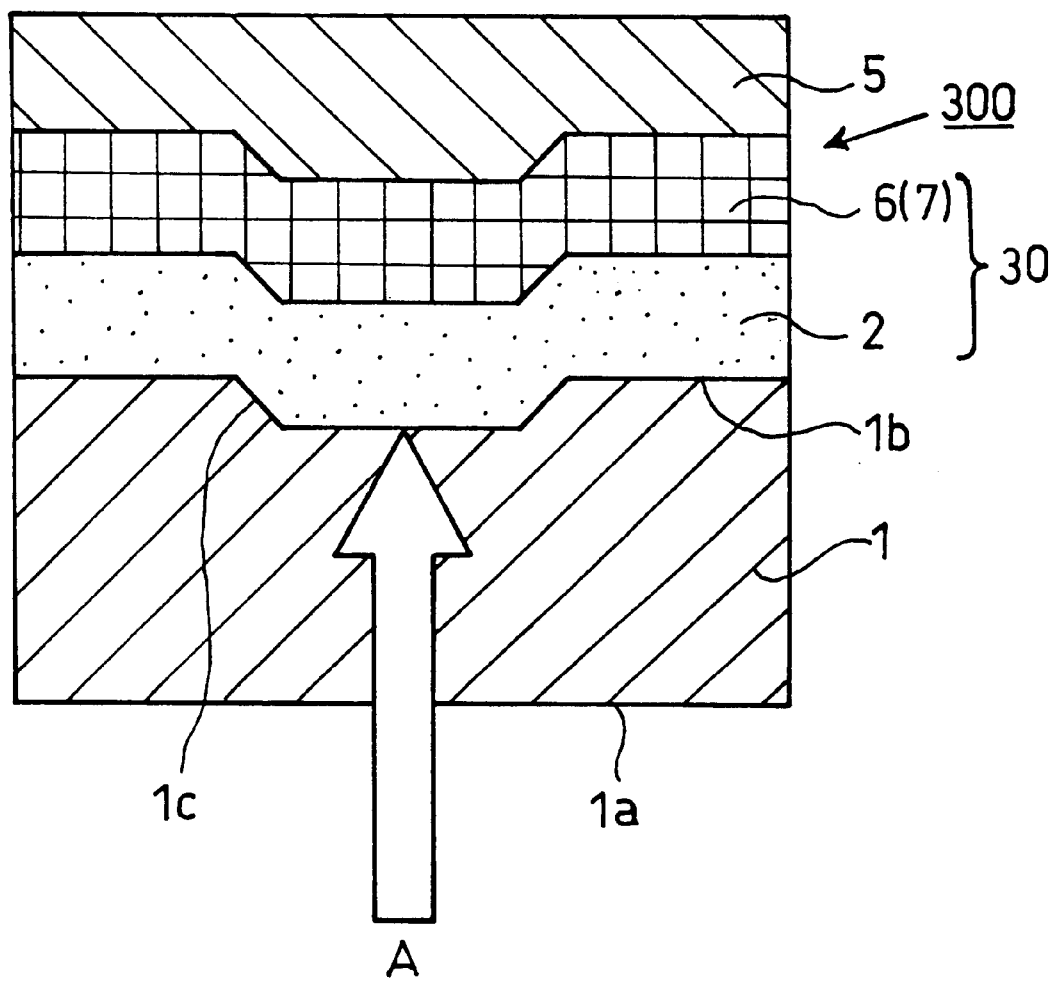
FIG. 4 is an explanatory diagram for illustrating the partial cross-sectional construction of an optical disk according to the Third Preferred Embodiment of the present invention.

A recording medium of this Third Preferred Embodiment is applied to an optical disk in which information is recorded by applying a laser beam to a recording film. The laser beam works as an external energy. The recording film has a first substance and a second substance. FIG. 4 illustrates the partial cross-sectional construction of an optical disk 300 of this preferred embodiment.

An optical disk 300 is formed in a disk shape as a whole. As illustrated in FIG. 4, a plurality of layers are formed and laminated. 1 is a disk-shaped transparent substrate (for example, in a thickness of 1.2 mm) made from polycarbonate, for instance. A laser beam for optically recording and reading out information enters from a side 1a of the substrate 1 in the direction specified by the arrow "A". The side 1a, the laser-beam-incidence side, is a flat surface. In the opposite side 1b, there is formed a spiral or concentric guide groove (track) 1c for leading the laser beam.

On the opposite surface 1b of the substrate 1, there is formed a $GeS_x$ ($0 < x \leq 2$) film 2 as a first layer (a first substance). On the $GeS_x$ film 2, there is formed an Sn-57 wt. % Bi film 6 as a second layer (a second substance). The films 2 and 6 constitute a recording film 30 in the optical disk 300. Moreover, on the Sn-57 wt. % Bi film 6, there is formed a resin film (protective film) 5 which covers the recording film 30 to protect it and includes an ultraviolet-curable resin.

Next, a manufacturing method of the optical disk 300 will be described in detail with reference to a specific example.

The substrate 1 was prepared. The side 1a was formed as a flat surface. In the opposite surface 1b, there was formed the guide groove 1c. The substrate 1 was composed of a disk having a thickness of 1.2 mm, and was made from polycarbonate. On the opposite surface 1b of the substrate 1, the $GeS_x$ film 2 in a thickness of 146 nm was formed by an RF magnetron sputtering method with a $GeS_2$ target under the following film forming conditions of sputtering gas species: Ar, sputtering gas pressure: $4 \times 10^{-3}$ Torr and input electric power: 50–300 W.

Subsequently, the Sn-57 wt. % Bi film 6 in a thickness of 50 nm was formed by a DC sputtering method with an Sn-57 wt. % Bi target under the following film forming conditions of sputtering gas species: Ar, sputtering gas pressure: $4 \times 10^{-3}$ Torr and input electric power: 50–300 W.

Finally, the ultraviolet-curable resin was coated by a spin coating method. The ultraviolet-curable resin was cured by using a high-pressure mercury-vapor lamp to form the resin film 5. Thus, the optical disk 300 was manufactured.

The recording actions of the optical disk 300 of this preferred embodiment are as hereinafter described. In the portion of the guide groove 1c, the recording laser beam enters (irradiates) in the direction of the arrow "A", and is optically focused on the surface of the Sn-57 wt. % Bi film 6. The $GeS_x$ film 2 and the Sn-57 wt. % Bi film 6 undergo a chemical reaction. Accordingly, the optical characteristics (reflectance, etc.) vary at the reacted portions so that information can be recorded. It is believed that, in the reaction between the $GeS_x$ film 2 and the Sn-57 wt. % Bi film 6, sulfides ($SnS$ and $SnS_2$), etc., are formed.

In the optical disk 300 which was manufactured by the aforementioned manufacturing method, information was recorded by irradiating with a laser beam (recording laser beam) of wavelength: 780 nm from the side of the flat surface (side 1a) through an objective lens of NA (numeric aperture): 0.5 and by optically focusing the laser beam on the surface of the Sn-57 wt. % Bi film 6. At this moment, the irradiating conditions were linear velocity: 2.8 m/sec, recording frequency: 400 kHz and recording laser wave form: rectangular wave of 50% duty ratio.

As set forth in FIG. 5, the characteristics (recording characteristics) of the optical disk 300 in this instance were reflectance at unrecorded portions: 65%, recording laser power: 7 mW, C/N: 52 dB and modulation: 85%. Note that the modulation is a value which is obtained by subtracting the reflectance after the recording from the reflectance before the recording, multiplying the difference by a factor of 100 and dividing the product by the reflectance before the recording.

Then, FIG. 5 also summarizes the results on a comparative example to the present invention, comparative example which employed an Sn film 7, instead of the Sn-57 wt. % Bi film 6, as the second layer. In this instance, the characteristics (recording characteristics) of the optical disk 300 were reflectance at unrecorded portions: 30%, recording laser power: 6 mW, C/N: 47 dB and modulation: 85%.

As can be seen from FIG. 5, it is understood that the optical disk 300 of this preferred embodiment exhibited remarkably higher reflectance (reflectance at unrecorded portions) than the optical disk of the aforementioned comparative example, and that it was well balanced in terms of the characteristics, such as the reflectance (reflectance at unrecorded portions), the recording power, the C/N and the modulation.

These advantages are effected in the following manner. When the Sn film 7 was used as the second layer, the reaction between the $GeS_x$ film 2 (i.e., the first layer) and the Sn film 7 developed inevitably. Whereas, when the Sn-57 wt. % Bi film 6 was used as the second layer, the reaction between the $GeS_x$ film 2 (i.e., the first layer) and the Sn-57 wt. % Bi film 6 was suppressed.

Moreover, these two optical disks 300 were subjected to an environmental resistance test which was carried out at 55° C. for 96 hours. The optical disk 300 of this preferred embodiment could read out the recorded data. Whereas, it was impossible for the optical disk 300 of the comparative example to read out the recorded data.

As set forth above, the optical disk 300 of this preferred embodiment was better balanced in terms of the characteristics, such as the reflectance, the recording power, the C/N and the modulation, than the conventional optical disk. It is believed that the following operations effected the advantages.

First, even when the second substance contained the same Sn, the reactivities differed greatly in the formation of the films. The causes are believed as hereinafter described. Originally, $GeS_x$ and Sn are substances which are likely to react. However, the Sn-57 wt. % Bi alloy is used as the second layer as in this preferred embodiment, the second layer is composed of two phases at least. Namely, there arise a fine area "P" which contains Sn or Sn—Bi in which Sn is a major component, and a fine area "Q", which contains Bi or Sn—Bi in which Bi is a major component.

The phenomenon results from the fact that the Sn-57 wt. % Bi alloy is a eutectic alloy, and that it exhibits a low melting point of about 139° C. The crystals in the area "P" have tetragonal structures, and the crystals in the area "Q" have rhombohedral structures. Accordingly, in this preferred embodiment, the $GeS_x$ film 2 (i.e., the first layer) contacts with the Sn-57 wt. % Bi film 6 by way of the fine area "P" of high reactivity and the fine area "Q" of low reactivity. It is believed that the presence of the fine area "Q" suppresses the reaction in the formation of the films.

Since the Sn-57 wt. % Bi alloy exhibits a low melting point of about 139° C., it is possible to finely mix the areas "P" and "Q" in the formation of the films, and to uniformly distribute them in the entire second layer. When the melting point is too high, it is very difficult to fully separate the phases. Consequently, the second layer is formed of a substantially single compositional portion or phase only. As a result, it is believed that the function of the fine area "Q" is not effected. Thus, such a high melting point is not preferable.

Despite the fact that the light-absorptance gain is decreased by the increment of the reflectance more in the optical disk 300 of this preferred embodiment than in the comparative example, the recording power of the optical disk 300 of this preferred embodiment is small. The reason is believed to be mainly due to the decrement in the melting point of the second-layer substance (Sn-57 wt. % Bi alloy).

The melting point of Sn is about 232° C. The melting point of Sn-57 wt. % Bi alloy is about 139° C. as aforementioned. However, the low melting point does not only result in obtaining the modulation which is equivalent to that of the comparative example. In this preferred embodiment, when the recording laser beam enters the optical disk 300, the Sn-57 wt. % Bi alloy melts to a molten liquid substantially so that Sn and Bi are fully mixed with each other. Thus, Sn of high reactivity can react with $GeS_x$ directly. Simultaneously, since Sn is a molten liquid, the reaction between Sn and $GeS_x$ is a highly reactive reaction between a liquid phase and a solid phase which is more reactive than between solid phases. Thus, it is possible to obtain the high modulation.

The C/N of the optical disk 300 of this preferred embodiment is larger than that of the comparative example. This advantage results from the low noise level of this preferred embodiment. The noise level of the optical disk 300 of this preferred embodiment was about −58 dBm. The noise level of the optical disk 300 of the comparative example was about −51 dBm. The difference is believed as hereinafter described.

When Sn is used as the second layer as in the comparative example, since Sn has a low melting point, Sn recrystalizes on the surface of the substrate in the formation of the film. Moreover, since Sn is a simple metal, the crystalline particles grow granularly in the formation of the film. As a result, the crystalline particles grow finally to a particle size of from a couple of dozens to a couple of hundreds nm which is about the size of the wavelength of a laser beam used in the read-out of data stored in optical disk. Thus, a part of the laser beam, which is optically focused in the read-out of data stored in optical disk, is scattered, and results in the cause of the white noise to increase the noise level of optical disk. As a result, the white noise is the cause of the degradation in the C/N, one of the recording characteristics.

On the other hand, when an Sn-57 wt. % Bi alloy is used as the second layer as in this preferred embodiment, the second layer is constituted by two or more phases which include the fine area "P" and the fine area "Q" at least. The Sn-57 wt. % Bi alloy, whose melting point is lower than that of Sn, also recrystalized on the surface of the substrate in the formation of the film. However, since the Sn-57 wt. % Bi alloy is a eutectic alloy, the granular growth of the particles is suppressed to a certain extent. As a result, the second layer is formed by the increasing number of the particles rather than by the growth of the particles.

Thus, the scattering of the laser beam, which is optically focused in the read-out of data stored in the optical disk 300, is reduced more sharply in this preferred embodiment than in the comparative example. Accordingly, the noise level of the optical disk 300 of this preferred embodiment is decreased. As a result, the C/N, one of the recording characteristics, is inhibited from degrading. Hence, the optical disk 300 of this preferred embodiment exhibits good recording characteristics.

As described above, it is possible to say that, due to the various operations, the optical disk 300 of this preferred embodiment is balanced in terms of the characteristics, such as the reflectance, the recording power, the C/N and the modulation, better than the conventional optical disk.

Similarly to the advantages in the formation of the films, it is believed that the reaction inhibiting action of the fine area "Q", working as a reaction barrier in the second layer, results in the difference between the environmental resistance test results on this preferred embodiment and those on the comparative example. Thus, it is possible to say that this preferred embodiment is good in that the reaction between the films 2 and 6 is suppressed, reaction which degrades the recording characteristics in use.

Fourth Preferred Embodiment

FIG. 6 illustrates the partial cross-sectional arrangement of an optical disk 400 according to this Fourth Preferred Embodiment. In addition to the recording film arrangement of the optical disk 300 illustrated in FIG. 4, the optical disk 400 employs an extra film arrangement. Namely, the optical disk 400 is characterized in that a third layer is disposed between the first layer and the second layer, in that the third layer enables the first layer and the second layer to react when being irradiated with a recording laser beam, and in that the third layer inhibits the first layer and the second layer from reacting when not being irradiated with the recording laser beam. This preferred embodiment operates and effects advantages in the same manner as the aforementioned Third Preferred Embodiment. Hereinafter, the portions, which differ from those of the Third Preferred Embodiment, will be described mainly. The same component members are designated at the same reference numerals in the drawing, and will not be described.

In this preferred embodiment, a $GeS_x$ ($0<x\leq 2$) film 2, which is identical with the $GeS_x$ film 2 of the Third Preferred Embodiment, is used as a first layer (i.e., a first substance). An Sn-3.2 wt. % Ag-2 wt. % Bi film 8 is used as a second layer (i.e., a second substance). A ZnS film 3 is used as a third layer which is interposed between the first layer and the second layer. These films 2, 3 and 8 constitute a recording film 40 in the optical disk 400.

Here, since the Sn-3.2 wt. % Ag-2 wt. % Bi film 8 is a eutectic alloy, the fine areas "P" and "Q" are formed therein in the same manner as the aforementioned Third Preferred Embodiment. Accordingly, in the formation of the films and in use, it is possible to suppress the reaction between the films 2 and 8, reaction which degrades the recording characteristics of the optical disk 400.

A manufacturing method of this preferred embodiment will be described in detail with reference to a specific example. In the same manner as the aforementioned Third Preferred Embodiment, the $GeS_x$ film 2 in a thickness of 144 nm was formed by an RF magnetron sputtering method on the other opposite surface 1b of the substrate 1.

Subsequently, the ZnS film 3 in a thickness of 2 nm was formed by an RF magnetron sputtering method with a ZnS target under the following film forming conditions of sputtering gas species: Ar, sputtering gas pressure: $4\times10^{-3}$ Torr and input electric power: 30–100 W.

Then, the Sn-3.2 wt. % Ag-2 wt. % Bi film 8 in a thickness of 50 nm was formed by a DC sputtering method with an Sn-3.2 wt. % Ag-2 wt. % Bi target under the following film forming conditions of sputtering gas species: Ar, sputtering gas pressure: $4\times10^{-3}$ Torr and input electric power. 50–300 W.

Finally, in the same manner as the above-described Third Preferred Embodiment, an ultraviolet-curable resin was used to form the resin film 5. Thus, the optical disk 400 was manufactured.

The recording actions of the optical disk 400 according to this preferred embodiment are as hereinafter described. In the portion of the guide groove 1c, the recording laser beam enters (irradiates) in the direction of the arrow "A", and is optically focused on the surface of the Sn-3.2 wt. % Ag-2 wt. % Bi film 8. The $GeS_x$ film 2 and the Sn-3.2 wt. % Ag-2 wt. % Bi film 8 pass through the ZnS film 3 and/or destroy the ZnS film 3, and undergo a chemical reaction. Accordingly, the optical characteristics (reflectance, etc.) vary at the reacted portions so that information can be recorded.

When the recording laser beam is not irradiated, the third layer is interposed between the first layer and the second layer so that the reaction inhibiting effect can be further enhanced. Consequently, it is possible to more efficiently inhibit the recording characteristics from degrading. It is believed that, in the reaction between the $GeS_x$ film 2 and the Sn-3.2 wt. % Ag-2 wt. % Bi film 8, sulfides (SnS and $SnS_2$), etc., are formed.

In the optical disk 400 which was manufactured by the aforementioned manufacturing method, information was recorded by irradiating with a laser beam (recording laser beam) of wavelength: 780 nm from the side of the flat surface (side 1a) through an objective lens of NA (numeric aperture): 0.5 and by optically focusing the laser beam on the surface of the Sn-3.2 wt. % Ag-2 wt. % Bi film 8. At this moment, the irradiating conditions were linear velocity: 2.8 m/sec, recording frequency: 400 kHz and recording laser wave form: rectangular wave of 50% duty ratio.

The characteristics (recording characteristics) of the optical disk 400 in this instance were, as set forth in FIG. 5, reflectance at unrecorded portions: 63%, recording laser power: 7 mW, C/N: 51 dB and modulation: 85%. Thus, similarly to the Third Preferred Embodiment, this preferred embodiment exhibited good recording characteristics.

Moreover, the optical disk 400 was subjected to an environmental resistance test which was carried out at 65° C. for 96 hours. The optical disk 400 could read out the recorded data.

Thus, the optical disk 400 of this preferred embodiment exhibited remarkably higher reflectance than the aforementioned comparative example, and it was well balanced in terms of the characteristics, such as the reflectance, the recording power, the C/N and the modulation.

Modified Versions of the Third and Fourth Preferred Embodiments

In addition, the substance constituting the first layer can be a substance including S as a constituent element, such as a Ge—Zn—S compound and a Ge—S—O compound, or a substance including Se as a constituent element, such as an Ag—Ga—Se compound. The substance constituting the second layer can be an Sn—Bi alloy or an Sn—Ag alloy which has a composition other than the aforementioned compositions. In addition to the Sn—Bi alloy or Sn—Ag alloy, the substance constituting the second layer can be an Sn—Au alloy, a Ga—Mg alloy or an Sn—Si compound. In the specific arrangements of optical disks, these constituent compounds or alloys are selected and combined. Such specific arrangements operate and effect advantages in the same manner as the Third and Fourth Preferred Embodiments.

Contrary to the above description, even if the crystalline structures do not differ, the area of high reactivity and the area of low reactivity can coexist in the second layer. This can be done even by varying the second layer compositionally.

The recording medium, to which the present invention is applied, is not limited to the aforementioned optical disk, but can have the other forms. Additionally, the external energy, which induces the reaction to vary the optical characteristics, is not limited to the laser beam, but can be light in general, heat, electromagnetic wave, sound wave, radiation, impact force, strain, etc. For example, the present invention can be applied to a thermo label, or the like, in which the first substance and the second substance react at a predetermined temperature to vary the optical characteristics so that information is recorded.

In any case, the form of the present recording medium is not limited to the above-described Third and Fourth Preferred Embodiments, as far as the present recording medium is a recording medium which comprises a first substance and a second substance at least, and whose optical characteristics are varied to record information by applying an external energy to at least one of the first and second substances to react the first and second substances, wherein: the first substance being a substance including at least one element selected from the group consisting of S and Se as a constituent element; and the second substance being a substance in which two or more compositionally-varying portions or two or more phases of different crystalline states exist.

In addition, the third substance inhibits the optical characteristics of the present recording medium from varying when the recording laser beam is not irradiated. Hence, to dispose the third substance between the first substance and the second substance, for instance, as set forth in the Fourth Preferred Embodiment, is an effective arrangement for further enhancing the environmental resistance of the present recording medium.

Another Modified Version

Another modified version will be hereinafter described with reference to FIG. 1. Except the configuration of the groove of the substrate, the optical disk 100 was manufactured in the same manner as the First through Fourth Preferred Embodiments. For instance, the optical disk 100 was manufactured with a substrate 1 which had a groove 1c formed on the side 1b. The groove 1c had such a configuration that it had a groove width of 520 nm and a groove depth of 35 nm.

Data were recorded on the optical disk 100 by using a data recording apparatus. The data recording apparatus irradiated the optical disk 100 with a laser beam whose wavelength was 780 nm and an objective lens whose NA was 0.50. Thereafter, this optical disk 100 was characterized in that it could read out the data by using either one of a first data reading-out apparatus or a second data reading-out apparatus. The first data reading-out apparatus irradiated the optical disk 100 with a laser beam whose wavelength was 780 nm and an objective lens whose NA was 0.45. The second data reading-out apparatus irradiated the optical disk 100 with a laser beam whose wavelength was 650 nm and an objective lens whose was NA was 0.40. This implies an unprecedented feature that, after data are recorded with a CD-R writer, the data can be read out by either one of a CD-ROM player or a DVD-ROM player.

Note that the configuration of the groove on the substrate, which effects the characteristics, is not limited to the aforementioned values. Suppose that a reading-out apparatus irradiates a recording medium with a laser beam whose wavelength is 650 nm and an objective lens whose NA is $\alpha$, the groove width w (units: nm) and the groove depth d (units: nm) can preferably fall in the following ranges, respectively:

$400 \leq$ groove width $w \leq (1749.5 - 3996.4 \times \alpha + 2416.9 \times \alpha^2)$; and $\{48.6 - 11.21 \times (w/100) + 1.41 \times (w/100)^2\} \leq$ groove depth $d \leq \{280.9 - 839.8 \times \alpha + 761.1 \times \alpha^2 - 18.96 \times (w/100) + 18.32 \times \alpha \times (w/100) + 0.86 \times (w/100)^2\}$.

Having now fully described the present invention, it will be apparent to one of ordinary skill in the art that many changes and modifications can be made thereto without departing from the spirit or scope of the present invention as set forth herein including the appended claims.

What is claimed is:

1. A recording medium which comprises a first substance and a second substance, wherein external energy applied to at least one of the first and second substances react them in order to change the optical characteristics of the substances for recording information, the recording medium comprising:

a first layer composed of a first substance including S,
   a second layer composed of a second substance including a metal, and
   a barrier layer being disposed between the first and second layers, which barrier allows the reaction between the first and second layers when a laser beam for recording is irradiated as an external energy, and suppresses the reaction between the first and second layers when the laser beam for recording is not irradiated.

2. The recording medium according to claim 1, wherein said first layer comprises Ge and S.

3. The recording medium according to claim 2, wherein said first layer comprises at least one member selected from the group consisting of $GeS_x$ ($0 < x \leq 2$), Ge—Zn—S and Ge—S—O.

4. The recording medium according to claim 1, wherein said second layer comprises at least one member selected from the group consisting of Sn, In, Sb, Bi, Pb, Cr, Mn, Fe, Ni, Cu, Zn and Ag.

5. The recording medium according to claim 4, wherein said second layer comprises at least one member selected from the group consisting of In, Cr, an In—Sn alloy and an Au—Cu alloy.

6. The recording medium according to claim 1, wherein said barrier layer comprises at least one member selected from the group consisting of metals, sulfides, nitrides, borides, carbon (C), carbides, oxides and phosphides.

7. The recording medium according to claim 6, wherein said barrier layer comprises at least one member selected from the group consisting of C, ZnS, Si and $SiO_2$.

8. The recording medium according to claim 1, wherein said barrier layer has a thickness of 2 nm or more.

9. The recording medium according to claim 1, wherein said barrier layer comprises a third substance having a melting point or a decomposition temperature of 300° C. or less.

10. The recording medium according to claim 9, wherein said third substance is an organic compound.

11. The recording medium according to claim 10, wherein said organic compound is an alkyl compound.

12. A recording medium comprising a first substance and a second substance at least, and whose optical characteristics are varied to record information by applying an external energy for recording to at least one of the first and second substances to react the first and second substances, wherein:

said first substance including at least one of S and Se; and
said second substance having two or more compositionally different portions or two or more phases with a different crystalline state.

13. The recording medium according to claim 12, wherein said first substance is $GeS_x$ ($0<x\leqq2$).

14. The recording medium according to claim 12, wherein said first substance is at least one member selected from the group consisting of Ge—Zn—S, Ge—S—O and Ag—Ga—Se.

15. The recording medium according to claim 12, wherein said second substance is a Sn-57 wt. % Bi alloy.

16. The recording medium according to claim 12, wherein said second substance is a Sn-3.2 wt. % Ag-2 wt. % Bi alloy.

17. The recording medium according to claim 12, wherein said second substance is at least one member selected from the group consisting of a Sn—Bi alloy, a Sn—Au alloy, a Ga—Mg alloy and a Sn—Si compound.

18. The recording medium according to claim 12 further comprising a third substance disposed between said first substance and said second substance, allowing said first substance and said second substance to react when said external energy is applied, and suppressing said reaction when said external energy is not applied.

19. The recording medium according to claim 18, wherein said third substance is ZnS.

20. A recording medium which comprises a first substance and a second substance, wherein external energy applied to at least one of the first and second substances react them in order to change the optical characteristics of the substances for recording information, the recording medium comprising:

a first layer composed of a first substance including Ag—Ga—Se, a second layer composed of a second substance including a metal, and a barrier layer disposed between the first and second layers, which barrier layer allows the reaction between the first and second layers when a laser beam for recording is irradiated as external energy, and suppresses the reaction between the first and second layers when the laser beam for recording is not irradiated.

* * * * *